Patented Sept. 13, 1932

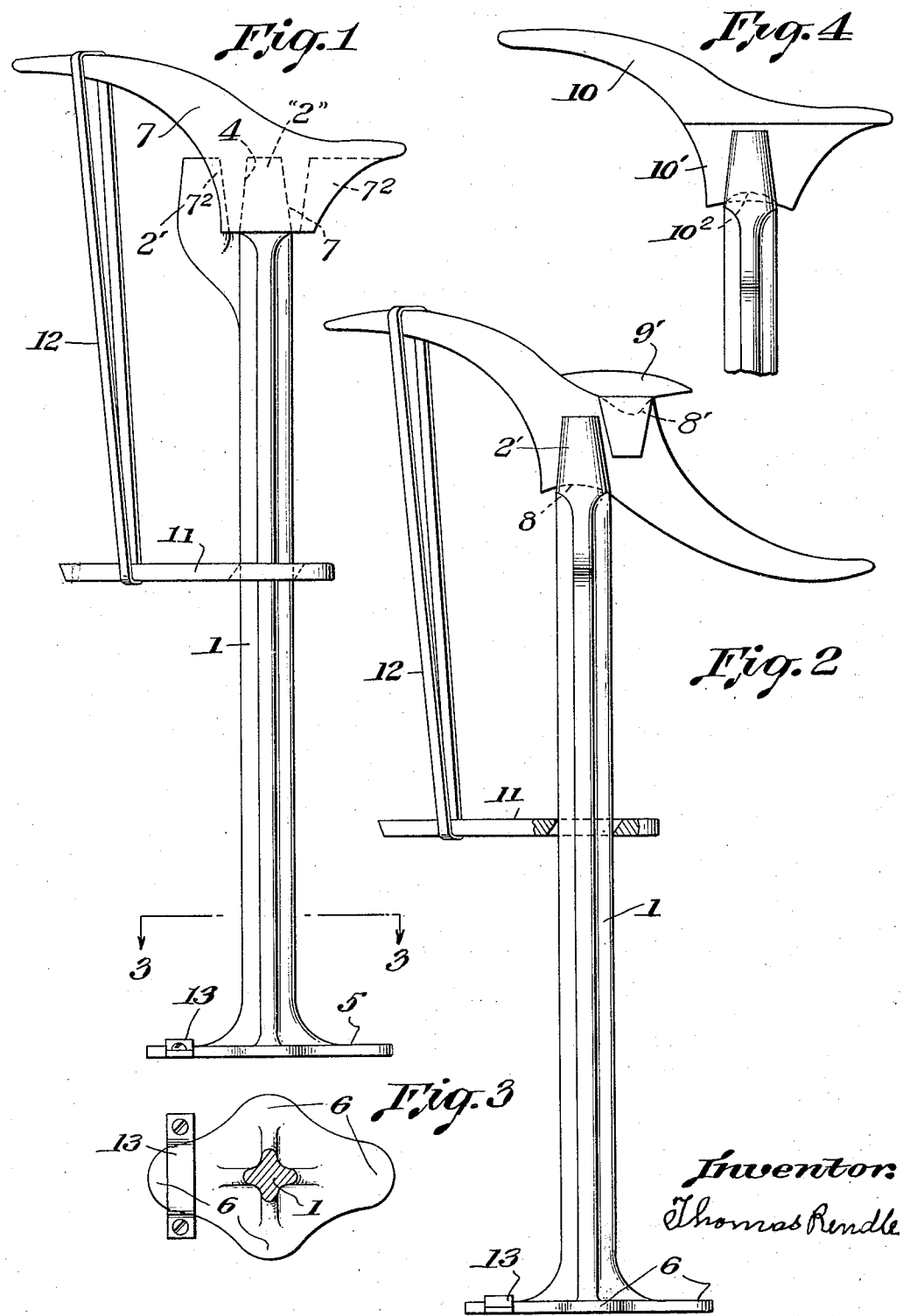

1,877,253

UNITED STATES PATENT OFFICE

THOMAS RENDLE, OF OTTAWA, ILLINOIS

IRON LAST AND STAND

Application filed March 5, 1929. Serial No. 344,295.

My invention refers to shoe repairing stands on handwork; and is an improvement on my U. S. No. 1,686,467, dated Oct. 2nd, 1928; and the objects of the invention consist in providing a special last and base in one piece; to cooperate with the whole socket last and a two sole last, a whole cleat last; also a heel part to cooperate with the cleats of a two sole last, a shoe holder tapered one way having an aperture opening at one side enclosing the standard, and a base band to assist in binding the base.

I attain these objects by the mechanism illustrated in the accompanying drawing, in which:

Figure 1 is a detailed view of the stand;

Figure 2 is a side elevation of the stand in one piece;

Figure 3 is a plain view of the base band and

Figure 4 is a side view of the whole cleat last transversely mounted. Similar figures refer to similar parts throughout the several views: A corrugated standard 1, being provided with a tapered circular last mount "2" fixed at one end, and a special tapered circular last cleat 2' at one side and a special slot mount 4, at one end. The opposite end of the standard is provided with a rigidly fixed base 5 having four projections 6 at the opposite end, in lieu of the separate base and base spindle. A whole last 7 being provided with a tapered circular socket 7' and a tapered brim having a concave groove $7^2$ in front and a similar groove $7^2$ behind the socket, whereby said last is locked from rotation, to cooperate with the special circular last mounts reversely to extend the heel; the two sole lasts are rigidly fixed together in opposite directions, having a tapered concave groove at each side 8' and a curve at the end of each cleat; to cooperate with the tapered slot between the circular last mounts, reversely a heel part 9' having a tapered projecting breast and two tapered arms circular at the inner sides, and the whole cleat last 10 being provided with a tapered, rigidly fixed cleat mount 10' and a tapered concave groove at each side $10^2$ and a curve at one end positioned between the circular mounts, a shoe holding device 11 having an aperture opening at one side to encircle the corrugated standard and having a looped strap connected with the handle 12 to connect with a shoe and a rigidly fixed base band 13 adapted to be securely fastened to a wood basis by a screw at each side with the corrugated standard and a looped strap fastened to the holder to connect a shoe, a rigidly fixed base at the opposite end of the standard provided with four tapered perforated projections at the opposite sides and a perforated base band adapted to receive fasteners, whereby the stand may be held and released to reverse the last support.

The method of operation is as follows:

And consists in a shoe repairing stand and refers to iron lasts and stand provided with a special last mount to cooperate with a few last parts of diverse kinds for mending the soles and heels of shoes in all sizes; and the advantages consist in their stability and compactness and the shoe-holder and the band to assist in holding the shoe and the stand in different positions.

Having thus described my invention, what I claim as new and desire to secure by Letters Patent of the United States is:

The combination in a shoe repairing stand of a last support provided with a tapered circular last mount rigidly fixed at one end of the standard and a special tapered circular last cleat rigidly fixed at one side divided by a special tapered slot mount therebetween, adapted to co-operate with the socket of a whole last, and the cleats of a two sole last and the cleat of a whole last positioned between the two circular mounts, a two sole last, a heel part having a breast projection and the two tapered arms circular at the inner sides to co-operate with the cleats of the two sole last and a slot between the circular mounts, a shoe holder provided with a gripping device tapered one way to co-operate with the corrugated standard and a looped strap fastened to the holder to connect a shoe, a rigidly fixed base at the opposite end of the standard provided with four perforated tapered projections at the opposite sides, and a perforated base band adapted to receive fasteners, whereby the stand may be held and released to reverse the last support.

Signed at Ottawa, in the county of La Salle and State of Illinois.

THOMAS RENDLE.